(12) United States Patent
Ochiai et al.

(10) Patent No.: US 11,537,068 B2
(45) Date of Patent: Dec. 27, 2022

(54) INTERMEDIATE TRANSFER BODY AND IMAGE FORMING APPARATUS

(71) Applicant: FUJIFILM Business Innovation Corp., Tokyo (JP)

(72) Inventors: Makoto Ochiai, Kanagawa (JP); Masato Furukawa, Kanagawa (JP); Minoru Rokutan, Kanagawa (JP); Haruyuki Namba, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/466,019

(22) Filed: Sep. 3, 2021

(65) Prior Publication Data
US 2022/0373938 A1 Nov. 24, 2022

(30) Foreign Application Priority Data
May 18, 2021 (JP) .............................. JP2021-084123

(51) Int. Cl.
*B32B 27/02* (2006.01)
*G03G 15/16* (2006.01)

(52) U.S. Cl.
CPC ......... *G03G 15/162* (2013.01); *G03G 15/161* (2013.01); *B32B 2307/302* (2013.01)

(58) Field of Classification Search
CPC ............ B32B 2307/302; G03G 15/161; G03G 15/162
See application file for complete search history.

(56) References Cited

U.S. PATENT DOCUMENTS
2020/0019093 A1  1/2020  Tsuruga et al.

FOREIGN PATENT DOCUMENTS
JP  2019-159229 A  9/2019
JP  2020-012919 A  1/2020

*Primary Examiner* — Lawrence D Ferguson
(74) *Attorney, Agent, or Firm* — Sughrue Mion, PLLC

(57) ABSTRACT

An intermediate transfer body includes a base layer and a surface layer disposed on the base layer. The difference between the volume resistivity of the intermediate transfer body at an application voltage of 100 V, a temperature of 22° C., and a relative humidity of 55% and the volume resistivity of the intermediate transfer body at an application voltage of 500 kV, a temperature of 22° C., and a relative humidity of 55% is 2.0 log Ω·cm or less. The difference between the volume resistivity of the intermediate transfer body at an application voltage of 500 kV, a temperature of 28° C., and a relative humidity of 85% and the volume resistivity of the intermediate transfer body at an application voltage of 500 kV, a temperature of 10° C., and a relative humidity of 30% is 1.0 log Ω·cm or less.

20 Claims, 3 Drawing Sheets

INTERMEDIATE TRANSFER BODY AND IMAGE FORMING APPARATUS

CROSS-REFERENCE TO RELATED APPLICATIONS

This application is based on and claims priority under 35 USC 119 from Japanese Patent Application No. 2021-084123 filed May 18, 2021.

BACKGROUND

(i) Technical Field

The present disclosure provides an intermediate transfer body and an image forming apparatus.

(ii) Related Art

Japanese Laid Open Patent Application Publication No. 2020-012919 discloses an intermediate transfer belt having a surface resistivity of $1\times10^9$ $\Omega/\square$ or more and a volume resistivity of $1\times10^{12}$ $\Omega\cdot$cm or less. The intermediate transfer belt includes a layer including polyether ether ketone and carbon black. The proportion of the carbon black in the layer is 22.5% to 28.5% by weight. The proportion of a first carbon black having a DBP oil absorption of 93 to 127 ml/100 g to the carbon black included in the layer is 50% to 90% by weight. The proportion of a second carbon black having a DBP oil absorption of 36 to 79 ml/100 g to the carbon black included in the layer is 10% to 50% by weight.

Japanese Laid Open Patent Application Publication No. 2019-159229 discloses an intermediate transfer body that includes a conductive support including polyether ether ketone and a conductant agent, an ionic conductive layer including a polymer-type ionic conductive material, and a protection layer including a hydrophobic synthetic resin. The volume resistivity of the intermediate transfer body which is measured when a voltage of 100 V is applied to the intermediate transfer body for 5 seconds is $1\times10^8$ to $1\times10^{13.5}$ $\Omega\cdot$cm. The surface resistivity of the intermediate transfer body which is measured when a voltage of 500 V is applied to the intermediate transfer body for 5 seconds is $1\times10^9$ to $1\times10^{13.5}$ $\Omega/\square$.

SUMMARY

Aspects of non-limiting embodiments of the present disclosure relate to an intermediate transfer body that may reduce occurrence of ghosting compared with an intermediate transfer body such that the difference between the volume resistivity of the intermediate transfer body at an application voltage of 100 V, a temperature of 22° C., and a relative humidity of 55% and the volume resistivity of the intermediate transfer body at an application voltage of 500 kV, a temperature of 22° C., and a relative humidity of 55% is more than 2.0 log $\Omega\cdot$cm or an intermediate transfer body such that the difference between the volume resistivity of the intermediate transfer body at an application voltage of 500 kV, a temperature of 28° C., and a relative humidity of 85% and the volume resistivity of the intermediate transfer body at an application voltage of 500 kV, a temperature of 10° C., and a relative humidity of 30% is more than 1.0 log $\Omega\cdot$cm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an intermediate transfer body including a base layer, and a surface layer disposed on the base layer, wherein a difference between a volume resistivity of the intermediate transfer body at an application voltage of 100 V, a temperature of 22° C., and a relative humidity of 55% and a volume resistivity of the intermediate transfer body at an application voltage of 500 kV, a temperature of 22° C., and a relative humidity of 55% is 2.0 log $\Omega\cdot$cm or less, wherein a difference between a volume resistivity of the intermediate transfer body at an application voltage of 500 kV, a temperature of 28° C., and a relative humidity of 85% and a volume resistivity of the intermediate transfer body at an application voltage of 500 kV, a temperature of 10° C., and a relative humidity of 30% is 1.0 log $\Omega\cdot$cm or less.

BRIEF DESCRIPTION OF THE DRAWINGS

Exemplary embodiments of the present disclosure will be described in detail based on the following figures, wherein.

DETAILED DESCRIPTION

Figure 1:
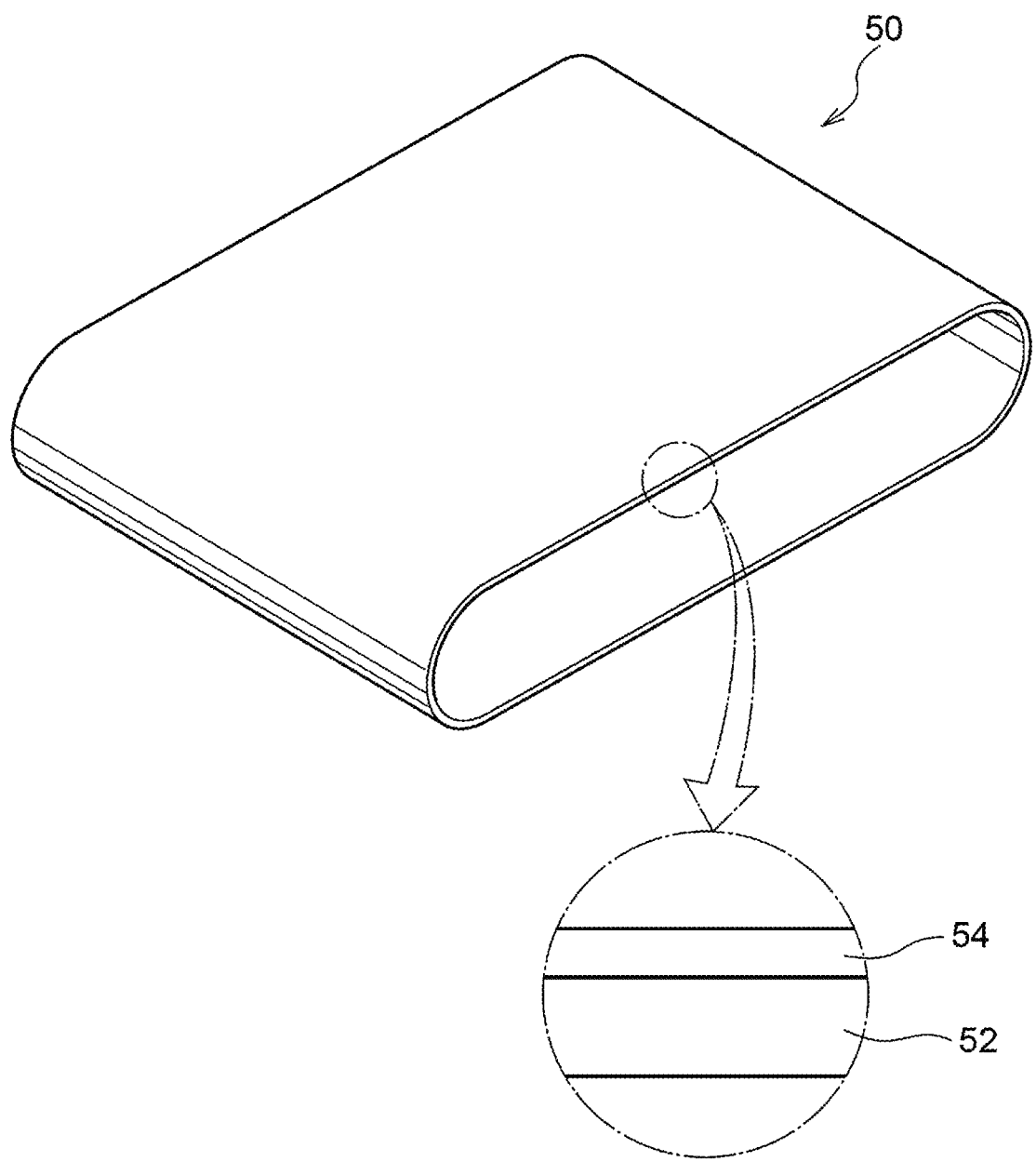
FIG. 1 is a schematic perspective view of an example of an intermediate transfer body according to an exemplary embodiment.

An exemplary embodiment of the present disclosure is described below. The following description and Examples below are intended to be illustrative of the exemplary embodiment and not restrictive of the scope of the exemplary embodiment.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

The term "step" used herein refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the present disclosure may include plural types of substances that correspond to the component. In the present disclosure, in the case where a composition includes plural types of substances that correspond to a component of the composition, the content of the component in the composition is the total content of the substances in the composition unless otherwise specified.

Intermediate Transfer Body

An intermediate transfer body according to an exemplary embodiment includes a base layer and a surface layer disposed on the base layer. The difference between the volume resistivity of the intermediate transfer body measured at an application voltage of 100 V, a temperature of 22° C., and a relative humidity of 55% and the volume resistivity of the intermediate transfer body measured at an application voltage of 500 kV, a temperature of 22° C., and a relative humidity of 55% is 2.0 log Ω·cm or less.

The difference between the volume resistivity of the intermediate transfer body measured at an application voltage of 500 kV, a temperature of 28° C., and a relative humidity of 85% and the volume resistivity of the intermediate transfer body measured at an application voltage of 500 kV, a temperature of 10° C., and a relative humidity of 30% is 1.0 log Ω·cm or less.

Hereinafter, the difference between the volume resistivity of the intermediate transfer body measured at an application voltage of 100 V, a temperature of 22° C., and a relative humidity of 55% and the volume resistivity of the intermediate transfer body measured at an application voltage of 500 kV, a temperature of 22° C., and a relative humidity of 55% is referred to as "D$\rho$1" (unit: log Ω·cm), and the difference between the volume resistivity of the intermediate transfer body measured at an application voltage of 500 kV, a temperature of 28° C., and a relative humidity of 85% and the volume resistivity of the intermediate transfer body measured at an application voltage of 500 kV, a temperature of 10° C., and a relative humidity of 30% is referred to as "D$\rho$2" (unit: log Ω·cm).

D$\rho$1 indicates the electrical stability of the intermediate transfer body with respect to voltage variation.

D$\rho$2 indicates the electrical stability of the intermediate transfer body with respect to environmental variation.

Since the D$\rho$1 of the intermediate transfer body according to this exemplary embodiment is 2.0 or less and the D$\rho$2 of the intermediate transfer body is 1.0 or less, the occurrence of ghosting (i.e., a phenomenon in which a previous image emerges in a next image) may be reduced.

If the above D$\rho$1 is more than 2.0, the amount of time required for attenuating the surface potential of the intermediate transfer body is increased by residual electric charge and, consequently, ghosting may occur. Furthermore, abnormal electrical discharge that occurs between the surface layer and a transfer unit is likely to worsen. This electrical discharge may worsen degradation of the surface of the intermediate transfer member. From the above viewpoint, in this exemplary embodiment, the above D$\rho$1 is 2.0 or less, is preferably 1.8 or less, and is ideally 0.

Either the volume resistivity of the intermediate transfer body measured at an application voltage of 100 V, a temperature of 22° C., and a relative humidity of 55% or the volume resistivity of the intermediate transfer body measured at an application voltage of 500 kV, a temperature of 22° C., and a relative humidity of 55% may be higher. It is preferable that the volume resistivity of the intermediate transfer body measured at an application voltage of 100 V, a temperature of 22° C., and a relative humidity of 55% be higher than that measured at an application voltage of 500 kV, a temperature of 22° C., and a relative humidity of 55%.

The volume resistivity (unit: log Ω·cm) of the intermediate transfer body measured at an application voltage of 100 V, a temperature of 22° C., and a relative humidity of 55% is preferably 9.5 or more and 13.5 or less, is more preferably 10.0 or more and 12.5 or less, and is further preferably 10.5 or more and 12.0 or less.

The volume resistivity (unit: log Ω·cm) of the intermediate transfer body measured at an application voltage of 500 kV, a temperature of 22° C., and a relative humidity of 55% is preferably 7.5 or more and 11.5 or less, is more preferably 8.0 or more and 11.0 or less, and is further preferably 8.5 or more and 10.0 or less.

If the above D$\rho$2 is larger than 1.0, in a high-speed range in which the application voltage needs to be increased, inconsistencies in the residual electric charge may occur and ghosting may occur due to the impacts of the residual electric charge present on the intermediate transfer body. From the above viewpoint, in this exemplary embodiment, the above D$\rho$2 is 1.0 or less, is preferably 0.8 or less, and is ideally 0.

Either the volume resistivity of the intermediate transfer body measured at an application voltage of 500 kV, a temperature of 28° C., and a relative humidity of 85% or the volume resistivity of the intermediate transfer body measured at an application voltage of 500 kV, a temperature of 10° C., and a relative humidity of 30% may be higher. It is preferable that the volume resistivity of the intermediate transfer body measured at an application voltage of 500 kV, a temperature of 10° C., and a relative humidity of 30% be higher than the volume resistivity of the intermediate transfer body measured at an application voltage of 500 kV, a temperature of 28° C., and a relative humidity of 85%.

The volume resistivity (unit: log Ω·cm) of the intermediate transfer body measured at an application voltage of 500 kV, a temperature of 28° C., and a relative humidity of 85% is preferably 7.5 or more and 11.0 or less, is more preferably 8.0 or more and 10.0 or less, and is further preferably 8.5 or more and 9.0 or less.

The volume resistivity (unit: log Ω·cm) of the intermediate transfer body measured at an application voltage of 500 kV, a temperature of 10° C., and a relative humidity of 30% is preferably 8.5 or more and 12.0 or less, is more preferably 9.0 or more and 11.0 or less, and is further preferably 9.5 or more and 10.5 or less.

The D$\rho$1 and D$\rho$2 of the intermediate transfer body can be controlled by, for example, the types and contents of the constituents included in the surface layer. The intermediate transfer body according to this exemplary embodiment is selected after the above volume resistivity values of the intermediate transfer body have been measured and the D$\rho$1 and D$\rho$2 of the intermediate transfer body have been confirmed.

In this exemplary embodiment, volume resistivity is measured in the following manner.

The measurement is conducted at a temperature of 22° C. and a relative humidity of 55%, at a temperature of 28° C. and a relative humidity of 85%, or at a temperature of 10° C. and a relative humidity of 30%. The intermediate transfer body is placed in the above measurement environment for 24 hours or more to perform air conditioning.

The resistance meter used is a micro current meter "R8430A" produced by Advantest Corporation. The probe used is a UR probe produced by Mitsubishi Chemical Corporation.

In the measurement, a voltage of 100 V or 500 kV is applied to the intermediate transfer body for 5 seconds. The load applied is 1 kgf.

The measurement is conducted at the center and both ends (i.e., 3 positions) of the intermediate transfer body in the width direction, for each of 6 positions spaced at regular intervals in the circumferential direction of the intermediate transfer body, that is, 18 positions in total. The arithmetic average of resistance values measured at the above 18 positions is calculated.

FIG. 1 is a schematic perspective view of an example of the intermediate transfer body according to this exemplary embodiment. The intermediate transfer body 50 illustrated in FIG. 1 is an endless belt-shaped member. The intermediate transfer body according to this exemplary embodiment is not limited to this and may be roller-shaped.

The intermediate transfer body 50 illustrated in FIG. 1 includes a base layer 52 and a surface layer 54. The surface layer 54 is a layer constituting the outer peripheral surface of the intermediate transfer body 50.

Details of each of the layers constituting the intermediate transfer body are described below.

Base Layer

The base layer may be a semiconductive film or sheet including a resin and a conductant agent.

Examples of the resin include a polyamide, a polyimide, a polyamide imide, a polyether imide, a polyether ether ketone, a polyphenylene sulfide, a polyethersulfone, a polyphenylsulfone, a polysulfone, a polyethylene terephthalate, a polybutylene terephthalate, a polyacetal, a polycarbonate, and a polyester. A polyimide, a polyamide imide, and a polyether ether ketone may be used in consideration of the strength and durability of the base layer. The above resins may be used alone or in combination of two or more.

Examples of the conductant agent include carbon black materials, such as Ketjenblack, oil furnace black, channel black, and acetylene black; metals, such as aluminum and nickel; metal oxides, such as indium tin oxide, tin oxide, titanium oxide, and yttrium oxide; ionic conductive substances, such as potassium titanate, potassium chloride, sodium perchlorate, and lithium perchlorate; and conductive polymers, such as polyaniline, polyether, polypyrrole, polysulfone, and polyacetylene. The above conductant agents may be used alone or in combination of two or more.

Carbon black may be used as a conductant agent included in the base layer. The average primary particle size of carbon black used as a conductant agent included in the base layer may be 10 nm or more and 40 nm or less.

The content of the conductant agent varies by the type of the conductant agent used. In the case where carbon black is used as a conductant agent, the content of the conductant agent may be 5 parts by mass or more and 40 parts by mass or less relative to 100 parts by mass of the resin.

The base layer may include additives, such as an antioxidant, a crosslinking agent, a flame retardant, a colorant, a surfactant, a dispersant, and a filler.

The thickness of the base layer may be 30 μm or more and 150 μm or less.

Surface Layer

The surface layer may be, for example, a semiconductive layer including a resin and a conductant agent.

Examples of the resin include a polyamide, a polyimide, a polyamide imide, a polyether imide, a polyether ether ketone, a polyphenylene sulfide, a polyethersulfone, a polyphenylsulfone, a polysulfone, a polyethylene terephthalate, a polybutylene terephthalate, a polyacetal, a polycarbonate, a polyester, a polyether, a polyvinyl butyral, a styrene resin, an acrylic resin, an epoxy resin, and a silicone resin. The above resins may be used alone or in combination of two or more.

The resin may be a polyimide in consideration of the strength and durability of the surface layer. In the case where the surface layer includes a conductive filler, the polyimide may be a compound produced by imidization of polyamide acid (i.e., polyamic acid) produced by polymerization of a tetracarboxylic dianhydride with a diamine in order to enhance the dispersibility of the conductive filler.

Examples of the conductant agent include ionic conductive polymers, such as polyaniline, polyether, polypyrrole, polysulfone, and polyacetylene; ionic conductive substances, such as potassium titanate, potassium chloride, sodium perchlorate, and lithium perchlorate; carbon black materials, such as Ketjenblack, oil furnace black, channel black, and acetylene black; metals, such as aluminum and nickel; and metal oxides, such as indium tin oxide, tin oxide, titanium oxide, and yttrium oxide. The above conductant agents may be used alone or in combination of two or more.

Hereinafter, a particulate conductant agent composed of carbon black, a metal, a metal oxide, or the like is referred to as "conductive filler".

The conductant agent may be an ionic conductive polymer in order to enhance electrical stability with respect to voltage variation. Among ionic conductive polymers, at least one selected from the group consisting of polyaniline and polyether may be used.

The content of the ionic conductive polymer in the surface layer may be 3% by mass or more and 7.5% by mass or less of the total mass of the surface layer.

The conductant agent may be a conductive filler in order to reduce the likelihood of electric charge remaining on the surface layer and increase transfer efficiency. Among conductive fillers, carbon black may be used.

In the case where the surface layer includes carbon black, the average size of carbon black particles dispersed in the surface layer (hereinafter, this average particle size is referred to as "average dispersion particle size") is preferably 30 nm or less, is more preferably 20 nm or less, and is further preferably 15 nm or less in order to reduce the likelihood of electric charge remaining on the surface layer and increase transfer efficiency. The lower limit for the average dispersion particle size of carbon black in the surface layer is, for example, but not limited to, 10 nm or more.

The average dispersion particle size of carbon black in the surface layer is measured by the following method.

The surface layer is cut in the thickness direction by the cryomicrotome method to prepare a slice sample of the surface layer. An image of the slice sample is taken with a scanning electron microscope.

Within the image, 10 regions with sides of 4 micrometers are randomly selected. Thus, the total area of the observation regions is 160 μm$^2$. When the thickness of the surface layer is less than 4 μm, the number of the regions that are to be observed is increased such that the total area of the observation regions reaches 160 μm$^2$.

The length (nm) of the major axis of each of the carbon black particles that are found in the observation regions is measured, and the arithmetic average thereof is considered as an average dispersion particle size (nm). In the case where the carbon black particles are found in the form of primary particles, the length of the major axis of each primary particle is measured. In the case where the carbon black particles are found in the form of secondary particles, the length of the major axis of each secondary particle is measured. The length of the major axis of a particle is the length of the longest of the straight lines that connect any two points on the outline of the particle to each other.

The content of the carbon black in the surface layer is preferably 10% by mass or more and 35% by mass or less, is more preferably 15% by mass or more and 30% by mass or less, and is further preferably 17% by mass or more and 28% by mass or less of the total mass of the surface layer.

The surface layer may include the ionic conductive polymer and carbon black in order to control the $D\rho1$ and $D\rho2$ of the intermediate transfer body and to reduce the likelihood of electric charge remaining on the surface layer and increase transfer efficiency.

The ratio M1/M2 of the content M1 of the ionic conductive polymer in the surface layer to the content M2 of carbon black in the surface layer is preferably 0.5 or more and 1.5 or less and is more preferably 0.6 or more and 1.3 or less.

The surface layer may include additives, such as an antioxidant, a crosslinking agent, a flame retardant, a colorant, and a filler.

The thickness of the surface layer is preferably 1 μm or more and is more preferably 2 μm or more in consideration of the abrasion resistance of the surface layer. The thickness of the surface layer is preferably 20 μm or less and is more preferably 10 μm or less in consideration of the flex resistance of the intermediate transfer body.

Other Layer

The intermediate transfer body according to this exemplary embodiment may include a layer other than the base layer or the surface layer. The intermediate transfer body may include, for example, a metal layer or a metal oxide layer interposed between the base layer and the surface layer.

Method for Producing Intermediate Transfer Body

Examples of a method for producing the intermediate transfer body according to this exemplary embodiment include a production method including a first step of preparing a pipe-like member that serves as a base layer, and a second step of forming a surface layer on the pipe-like member.

The pipe-like member prepared in the first step may be any of the following molded articles: an extrusion molded article produced by melting a resin composition including a resin and a conductant agent, extruding the molten resin composition into a belt-like shape through a die, and solidifying the belt-shaped resin composition; an injection molded article produced by melting a resin composition including a resin and a conductant agent, charging the molten resin composition into a belt-shaped mold, and solidifying the belt-shaped resin composition; and a coat molded article prepared by applying a liquid composition including a resin, a resin precursor, or monomer, and a conductant agent to a core and solidifying the resulting coating film.

Examples of the second step include a step of applying a liquid composition including a resin, a resin precursor, or monomer, and a conductant agent onto the outer peripheral surface of the pipe-like member and solidifying the resulting coating film; and a step of applying a liquid composition including a resin, a resin precursor, or monomer, and a conductant agent to a core, solidifying the resulting coating film to prepare a pipe-like film, and depositing the pipe-like film on the pipe-like member. In the solidification of the liquid composition, optionally, drying, heating, electron beam irradiation, or ultraviolet irradiation may be performed in accordance with the types of the constituents.

Image Forming Apparatus

An image forming apparatus according to an exemplary embodiment includes a photosensitive member; a charging unit that charges a surface of the photosensitive member; an electrostatic image formation unit that forms an electrostatic image on the charged surface of the photosensitive member; a developing unit that includes a developer including a toner and develops the electrostatic image formed on the surface of the photosensitive member with the developer to form a toner image; an intermediate transfer body; a first transfer unit that transfers the toner image onto a surface of the intermediate transfer body as first transfer; and a second transfer unit that transfers the toner image transferred on the surface of the intermediate transfer body to a recording medium as second transfer. The intermediate transfer body is the intermediate transfer body according to the above-described exemplary embodiment.

The image forming apparatus according to this exemplary embodiment may optionally include, for example, the following components: a fixing unit that fixes the toner image transferred on the surface of the recording medium; a photosensitive member cleaning unit that cleans the surface of the photosensitive member that has not been charged, subsequent to the transfer of the toner image; and an erasing unit that irradiates, with erasing light, the surface of the photosensitive member that has not been charged, subsequent to the transfer of the toner image, in order to erase charge. A portion of the image forming apparatus according to this exemplary embodiment which includes the developing unit may have a cartridge structure (i.e., process cartridge) detachably attachable to the image forming apparatus.

An example of the image forming apparatus according to this exemplary embodiment is described below. The image forming apparatus is not limited thereto. Hereinafter, only components illustrated in drawings are described; others are omitted.

Figure 2:
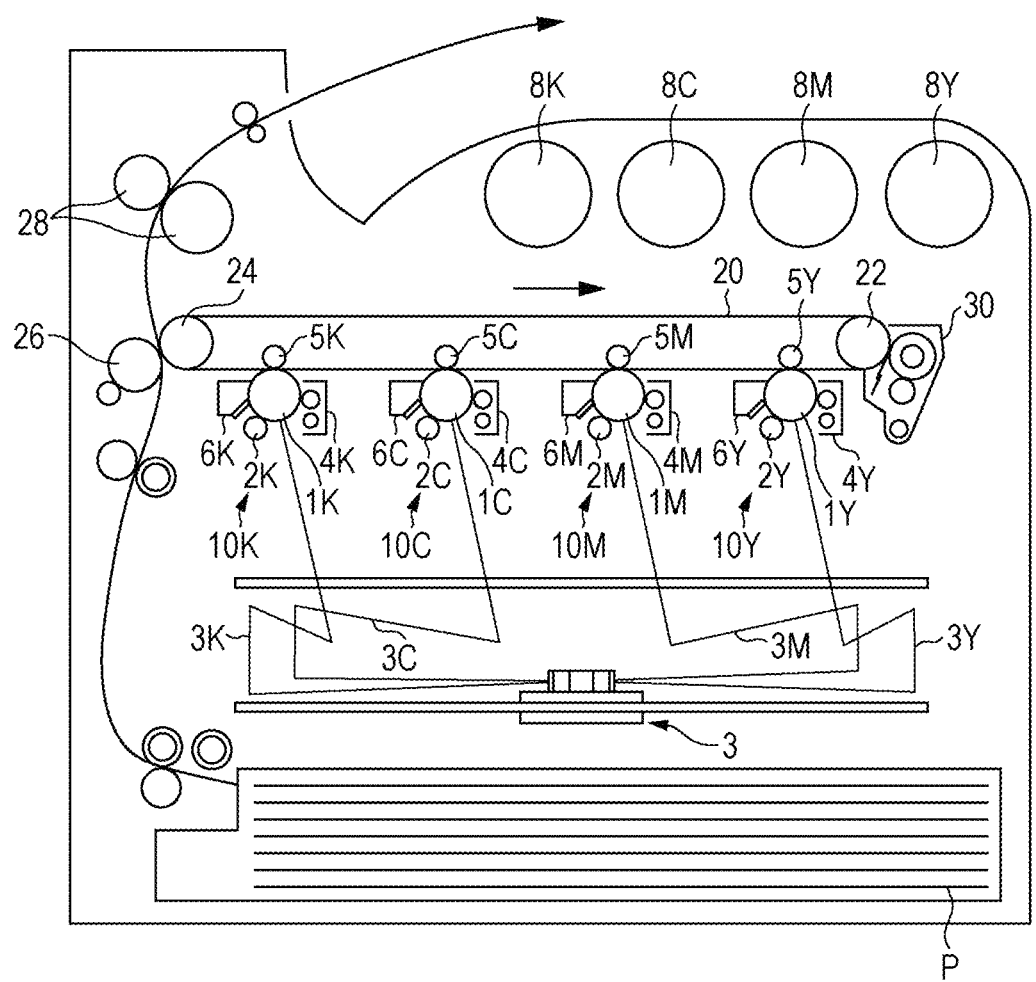
FIG. 2 is a schematic diagram illustrating an example of an image forming apparatus according to an exemplary embodiment.

FIG. 2 schematically illustrates the image forming apparatus according to this exemplary embodiment.

The image forming apparatus illustrated in FIG. 2 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt (example of the intermediate transfer body) 20 runs above and extends over the units 10Y, 10M, 10C, and 10K. The intermediate transfer belt 20 is wound around a drive roller 22 and a support roller 24, which are arranged to contact with the inner surface of the intermediate transfer belt 20, and runs clockwise in FIG. 2, that is, in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer belt-cleaning device 30 is disposed so as to contact with the image holding surface of the intermediate transfer belt 20 and to face the drive roller 22.

Developing devices (examples of the developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs.

The first unit 10Y includes a photosensitive member 1Y. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer unit) 5Y that transfers the developed toner image to the intermediate transfer belt 20; and a photosensitive member cleaning device 6Y that removes a toner remaining on the surface of the photosensitive member 1Y after the first transfer.

The first transfer roller 5Y is disposed inside of the intermediate transfer belt 20 so as to face the photosensitive member 1Y. Each of the first transfer rollers 5Y, 5M, 5C, and 5K of the respective units is connected to a bias power supply (not illustrated) that applies a first transfer bias to the first transfer rollers.

A second transfer roller (example of the second transfer unit) 26 is disposed outside of the intermediate transfer belt 20 so as to face the support roller 24 across the intermediate transfer belt 20. The second transfer roller 26 is connected to a bias power supply (not illustrated) that applies a second transfer bias to the second transfer roller 26.

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive support (e.g., volume resistivity at 20° C.: $1 \times 10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3 irradiates the charged surface of the photosensitive member 1Y with the laser beam 3Y on the basis of the image data of the yellow image sent from the controller (not illustrated). As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is developed and visualized in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, in the first unit 10Y, for example, +10 µA by a controller (not illustrated).

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The intermediate transfer belt 20 on which toner images of four colors are multiple-transferred in the first to fourth units is then transported to a second transfer section formed by the intermediate transfer belt 20, the support roller 24, and the second transfer roller 26. A recording paper (example of the recording medium) P is fed by a feed mechanism into a narrow space between the second transfer roller 26 and the intermediate transfer belt 20 that contact with each other at the predetermined timing.

The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

The recording paper P, on which the toner image is transferred, is transported into a nip part of the fixing device (example of the fixing unit) 28 at which a pair of fixing rollers contact with each other. The toner image is fixed to the recording paper P to form a fixed image. The recording paper P, to which the color image has been fixed, is transported toward an exit portion. Thus, the series of the steps for forming a color image are terminated.

Examples of the recording paper P to which a toner image is transferred include plain paper used in electrophotographic copiers, printers, and the like.

Instead of the recording paper P, OHP films and the like may be used as a recording medium.

EXAMPLES

The exemplary embodiments are described more specifically with reference to Examples below. The exemplary embodiments are not limited to Examples below. Synthesis, treatment, production, and the like are conducted at room temperature (25° C.±3° C.) unless otherwise specified.

Example 1

Preparation of Base Layer Forming Liquid Composition

To a N-methyl-2-pyrrolidone solution of polyamic acid produced from 3,3',4,4'-biphenyltetracarboxylic dianhydride and 4,4'-diaminodiphenyl ether (solid content after imide conversion: 18 mass %), 22 parts by mass of carbon black particles "FW200" produced by Orion Engineered Carbons are added relative to 100 parts by mass of solid component produced after imide conversion. The resulting mixture is stirred to form a base layer forming liquid composition.

Preparation of Pipe-like Member Used as Base Layer

An aluminum cylindrical body having an outside diameter of 278 mm and a length of 600 mm is prepared. While the aluminum cylindrical body is rotated, the base layer forming liquid composition is ejected onto a central part of the aluminum cylindrical body which has a width of 500 mm through a dispenser. While the aluminum cylindrical body is kept horizontal, the resulting coating film is dried by heating at 140° C. for 30 minutes. Subsequently, the coating film is heated for 120 minutes such that the maximum temperature is 320° C. Hereby, a polyimide pipe-like member is formed on the aluminum cylindrical body.

Preparation of Polyamic Acid Solution

A nitrogen gas dried with phosphorus pentoxide is passed through a flask equipped with a stirring rod, a thermometer, and a dropping funnel. Into the flask, 29.42 g (0.1 moles) of 3,3',4,4'-biphenyltetracarboxylic dianhydride and 117.68 g of N-methyl-2-pyrrolidone are charged. After the resulting mixture has been stirred to a sufficient degree to form a solution, a solution prepared by dissolving 20.02 g (0.1 moles) of 4,4'-diaminodiphenyl ether in 80.08 g of N-methyl-2-pyrrolidone is gradually added dropwise to the flask kept at 10° C. After the addition of the diamine solution has been terminated, stirring is performed while the temperature is maintained at 10° C. to 15° C. to perform polymerization. The reaction solution is charged into a large amount of methanol to perform reprecipitation purification. The precipitated white polymer is obtained by filtration, dried, and then again dissolved in N-methyl-2-pyrrolidone. Hereby, a 20-mass % polyamic acid solution (a) is prepared.

Synthesis of Polyaniline

Into a 10-liter separable flask, 6,000 g of ion-exchange water, 400 mL of 35% hydrochloric acid, and 400 g (4.295 moles) of aniline are charged. The resulting mixture is stirred to dissolve aniline. Into a beaker, 1,493 g of ion-exchange water is charged. While the beaker is cooled with ice water, 434 g (4.295 moles) of 98% concentrated sulfuric acid is added to and mixed with the ion-exchange water. Hereby, an aqueous sulfuric acid solution is prepared. The aqueous sulfuric acid solution is gradually added to the aniline solution while being cooled with ice.

Subsequently, an aqueous solution of an oxidizing agent, which is prepared by dissolving 980 g (4.295 moles) of ammonium peroxodisulfate in 2,300 g of ion-exchange water, is gradually added dropwise to the aniline solution while being cooled with ice. After the addition of the aqueous solution of ammonium peroxodisulfate has been terminated, stirring is performed for another one hour. After the addition of the aqueous solution has been terminated, the colorless and transparent solution turns to verdigris and then to blackish green with the progress of the polymerization. Subsequently, a blackish green powder is precipitated. This powder is separated from the solution by filtration, then cleaned with water and acetone, and dried in vacuum at room temperature. Hereby, 430 g of conductive polyaniline doped with sulfuric acid is prepared in the form of a blackish green powder.

Subsequently, 350 g of the doped conductive polyaniline powder is added to 4 L of 2 N ammonia water. The resulting mixture is stirred with a homomixer at a rotational speed of 5,000 rpm for 5 hours. The mixture has turned from blackish green to bluish violet. The resulting powder is separated from the mixture by filtration, then cleaned with water and acetone, and dried in vacuum at room temperature for 10 hours. Hereby, 280 g of a blackish brown undoped polyaniline powder is prepared.

Preparation of Polyaniline Solution

After 18.22 g (0.10 moles) of the undoped polyaniline powder has been reduced with hydrazine, the polyaniline powder is dissolved in 180 g of N-methyl-2-pyrrolidone. Hereby, a polyaniline solution is prepared.

Preparation of Polyamic Acid Composition

To the polyaniline solution, 17.42 g (0.10 moles) of phenolsulfonic acid is added as a dopant. The resulting mixture is gradually added to 500 g of the 20-mass % polyamic acid solution (a) while being stirred. The mixture is then filtered through a metal mesh having a pore size of 50 μm to remove aggregates. Hereby, a polyamic acid composition is prepared. The composition of the polyamic acid composition is as described below.

Composition of Polyamic Acid Composition

Polyamic acid: 100 g

Polyaniline: 18.22 g (0.05 moles, 18.22 parts by mass relative to 100 parts by mass of polyamic acid)

Dopant: 17.42 g (0.1 moles, 1 mole equivalent relative to 1 mole of polyaniline structure unit)

Solvent: 580 g

Preparation of Surface Layer Forming Liquid Composition

To 100 parts by mass of the polyamic acid composition, 20 parts by mass of carbon black particles "COLOR BLACK FW1" produced by Orion Engineered Carbons are added. The resulting mixture is stirred. The mixture is then passed through an opposing collision-type high pressure homogenizer produced by JOKOH CO., LTD. 5 times at 100 MPa. Hereby, a surface layer forming liquid composition is prepared.

Formation of Surface Layer

The surface layer forming liquid composition is casted onto the outer peripheral surface of the pipe-like member disposed on the aluminum cylindrical body with a T-die having a length of 500 mm and a slit of 0.4 mm. The resulting coating film is heated from 40° C. to 150° C. over 45 minutes and then passed through an oven having an inside temperature of 320° C. to 350° C. over 20 minutes in order to cure polyamic acid into polyimide.

Preparation of Endless Belt

The multilayer body including the base layer and the surface layer is removed from the aluminum cylindrical body and cut to a width of 363 mm. Hereby, an endless belt that serves as an intermediate transfer body is prepared. The intermediate transfer body has a width of 363 mm. The base layer has a thickness of 100 μm. The surface layer has a thickness of 5 μm.

Examples 2 to 4 and Comparative Examples 1 to 3

Intermediate transfer bodies are prepared as in Example 1, except that the average dispersion particle size of carbon black and the thickness of the surface layer are changed as described in Table 1.

Performance Evaluations
Ghosting

Figure 3:
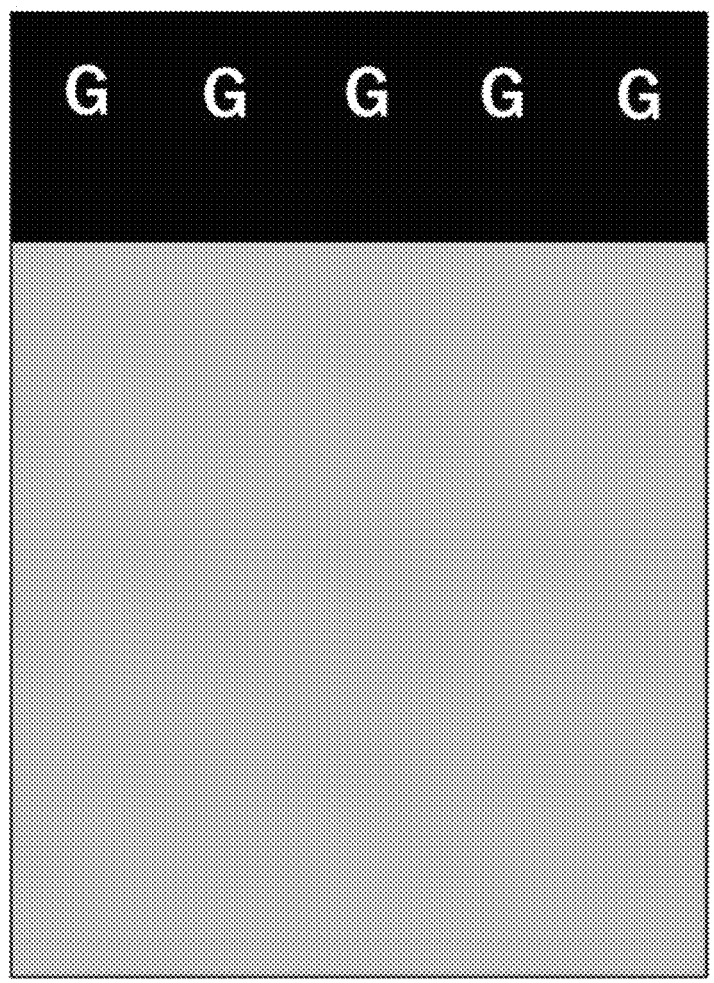
FIG. 3 is a schematic diagram illustrating an image formed for evaluating image quality in Examples.

A specific one of the intermediate transfer bodies prepared in Examples and Comparative Examples is attached to a modification of an electrophotographic image forming apparatus "DocuCentreColor500" produced by Fuji Xerox Co., Ltd. At a temperature of 22° C. and a relative humidity of 55%, the image illustrated in FIG. 3, which includes a region consisting of a black image having an image density of 100% and 5 outline characters "G" formed in the black image and a region consisting of a black halftone image having an image density of 40%, is sequentially formed on 10 A4-size paper sheets. A comparison between the first and tenth sheets is visually made. The degree of ghosting is classified in the following manner.

A: No change in the density of the characters "G" is confirmed.
B: A trace change in the density of the characters "G" is confirmed.
C: A slight change in the density of the characters "G" is confirmed but at an acceptable level for practical use.
D: A change in the density of the characters "G" is confirmed and at an unacceptable level for practical use.

Transfer Efficiency

A specific one of the intermediate transfer bodies prepared in Examples and Comparative Examples is attached to a modification of an electrophotographic image forming apparatus "DocuCentreColor500" produced by Fuji Xerox Co., Ltd. At a temperature of 22° C. and a relative humidity of 55%, an image having an area coverage of 1% is formed on 10,000 A4-size paper sheets. Subsequently, a 3 cm×4 cm solid patch is developed and transferred to the intermediate transfer body. The toner image transferred on the intermediate transfer body is taken using the adherence of the surface of an adhesive tape. The weight W1 of the transferred toner image is measured. Then, the 3 cm×4 cm solid patch is formed on a A4-size paper sheet. The weight W2 of the image is measured. The transfer efficiency (W2/W1× 100, units: %) is calculated from the above weights and classified in the following manner.

A: Transfer efficiency is 95% or more.
B: Transfer efficiency is 90% or more and less than 95%.
C: Transfer efficiency is 85% or more and less than 90%.
D: Transfer efficiency is less than 85%.

Degradation of Surface of Intermediate Transfer Body

A specific one of the intermediate transfer bodies prepared in Examples and Comparative Examples is attached to a modification of an electrophotographic image forming apparatus "DocuCentreColor500" produced by Fuji Xerox Co., Ltd. At a temperature of 22° C. and a relative humidity of 55%, a black solid image is formed on 200,000 A4-size paper sheets. The surface of the intermediate transfer body is visually inspected for the presence of roughening of the surface once every 50,000 sheets. The degradation of the surface of the intermediate transfer body is classified in the following manner, using the number of sheets at which roughening is confirmed.

A: No roughening is confirmed at 200,000 sheets.
B: No roughening is confirmed at 150,000 sheets but roughening is confirmed at 200,000 sheets.
C: No roughening is confirmed at 100,000 sheets but roughening is confirmed at 150,000 sheets.
D: Roughening is confirmed at 100,000 sheets.

| | Composition of polyamic acid composition | | Surface layer | | | Volume resistivity | | | | | | Performance evaluations | | |
|---|---|---|---|---|---|---|---|---|---|---|---|---|---|---|
| | Ionic conductive polymer Type | Dopant Type | Ionic conductive polymer Type | Carbon black Average dispersion particle size nm | Thickness μm | 22° C./RH55% 100 V logΩ·cm | 22° C./RH55% 500 kV logΩ·cm | Dρ1 logΩ·cm | 28° C./RH85% 500 kV logΩ·cm | 10° C./RH30% 500 kV logΩ·cm | Dρ2 logΩ·cm | Ghosting | Transfer efficiency | Degradation of surface of intermediate transfer body |
| Example 1 | Polyaniline | Phenol-sulfonic acid | Polyaniline | 13 | 5 | 11.0 | 9.5 | 1.5 | 9.3 | 9.7 | 0.4 | A | A | A |
| Example 2 | Polyaniline | Phenol-sulfonic acid | Polyaniline | 13 | 5 | 10.0 | 8.5 | 1.5 | 8.1 | 8.9 | 0.8 | A | B | A |
| Example 3 | Polyaniline | Phenol-sulfonic acid | Polyaniline | 13 | 5 | 13.0 | 11.2 | 1.8 | 11.1 | 11.7 | 0.6 | B | A | A |
| Example 4 | Polyaniline | Phenol-sulfonic acid | Polyaniline | 35 | 10 | 11.0 | 9.5 | 1.5 | 9.7 | 10.6 | 0.9 | A | A | C |
| Comparative Example 1 | Polyaniline | Phenol-sulfonic acid | Polyaniline | 13 | 5 | 11.7 | 9.5 | 2.2 | 9.2 | 10.0 | 0.8 | C | B | A |
| Comparative Example 2 | Polyaniline | Phenol-sulfonic acid | Polyaniline | 13 | 5 | 9.6 | 8.0 | 1.6 | 7.3 | 8.5 | 1.2 | B | C | A |
| Comparative Example 3 | Polyaniline | Phenol-sulfonic acid | Polyaniline | 13 | 5 | 10.8 | 8.5 | 2.3 | 7.7 | 9.0 | 1.3 | C | C | B |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An intermediate transfer body comprising:
a base layer; and
a surface layer disposed on the base layer,
wherein a difference between a volume resistivity of the intermediate transfer body at an application voltage of 100 V, a temperature of 22° C., and a relative humidity of 55% and a volume resistivity of the intermediate transfer body at an application voltage of 500 kV, a temperature of 22° C., and a relative humidity of 55% is 2.0 log Ω·cm or less, and
wherein a difference between a volume resistivity of the intermediate transfer body at an application voltage of 500 kV, a temperature of 28° C., and a relative humidity of 85% and a volume resistivity of the intermediate transfer body at an application voltage of 500 kV, a temperature of 10° C., and a relative humidity of 30% is 1.0 log Ω·cm or less.

2. The intermediate transfer body according to claim 1, wherein the difference between the volume resistivity of the intermediate transfer body at an application voltage of 100 V, a temperature of 22° C., and a relative humidity of 55% and the volume resistivity of the intermediate transfer body at an application voltage of 500 kV, a temperature of 22° C., and a relative humidity of 55% is 1.8 log Ω·cm or less.

3. The intermediate transfer body according to claim 1, wherein the difference between the volume resistivity of the intermediate transfer body at an application voltage of 500 kV, a temperature of 28° C., and a relative humidity of 85% and the volume resistivity of the intermediate transfer body at an application voltage of 500 kV, a temperature of 10° C., and a relative humidity of 30% is 0.8 log Ω·cm or less.

4. The intermediate transfer body according to claim 2, wherein the difference between the volume resistivity of the intermediate transfer body at an application voltage of 500 kV, a temperature of 28° C., and a relative humidity of 85% and the volume resistivity of the intermediate transfer body at an application voltage of 500 kV, a temperature of 10° C., and a relative humidity of 30% is 0.8 log Ω·cm or less.

5. The intermediate transfer body according to claim 1, wherein the surface layer includes a resin, an ionic conductive polymer, and a conductive filler.

6. The intermediate transfer body according to claim 2, wherein the surface layer includes a resin, an ionic conductive polymer, and a conductive filler.

7. The intermediate transfer body according to claim 3, wherein the surface layer includes a resin, an ionic conductive polymer, and a conductive filler.

8. The intermediate transfer body according to claim 4, wherein the surface layer includes a resin, an ionic conductive polymer, and a conductive filler.

9. The intermediate transfer body according to claim 5, wherein the ionic conductive polymer includes at least one selected from the group consisting of a polyaniline and a polyether.

10. The intermediate transfer body according to claim 6, wherein the ionic conductive polymer includes at least one selected from the group consisting of a polyaniline and a polyether.

11. The intermediate transfer body according to claim 7, wherein the ionic conductive polymer includes at least one selected from the group consisting of a polyaniline and a polyether.

12. The intermediate transfer body according to claim 8, wherein the ionic conductive polymer includes at least one selected from the group consisting of a polyaniline and a polyether.

13. The intermediate transfer body according to claim 5, wherein the conductive filler includes carbon black, and wherein an average size of particles of the carbon black dispersed in the surface layer is 30 nm or less.

14. The intermediate transfer body according to claim 6, wherein the conductive filler includes carbon black, and wherein an average size of particles of the carbon black dispersed in the surface layer is 30 nm or less.

15. The intermediate transfer body according to claim 7, wherein the conductive filler includes carbon black, and wherein an average size of particles of the carbon black dispersed in the surface layer is 30 nm or less.

16. The intermediate transfer body according to claim 8, wherein the conductive filler includes carbon black, and wherein an average size of particles of the carbon black dispersed in the surface layer is 30 nm or less.

17. The intermediate transfer body according to claim 9, wherein the conductive filler includes carbon black, and wherein an average size of particles of the carbon black dispersed in the surface layer is 30 nm or less.

18. The intermediate transfer body according to claim 10, wherein the conductive filler includes carbon black, and wherein an average size of particles of the carbon black dispersed in the surface layer is 30 nm or less.

19. The intermediate transfer body according to claim 5, wherein the resin includes a compound produced by imidization of polyamic acid.

20. An image forming apparatus comprising:
a photosensitive member;
a charging unit that charges a surface of the photosensitive member;
an electrostatic image formation unit that forms an electrostatic image on the charged surface of the photosensitive member;
a developing unit that includes a developer including a toner and develops the electrostatic image formed on the surface of the photosensitive member with the developer to form a toner image;
the intermediate transfer body according to claim 1;
a first transfer unit that transfers the toner image onto a surface of the intermediate transfer body as first transfer; and
a second transfer unit that transfers the toner image transferred on the surface of the intermediate transfer body to a recording medium as second transfer.

* * * * *